INVENTOR
ADRIAN PERCY CLARK
BY
DEZSOE STEINHERZ
ATTORNEY

INVENTOR
ADRIAN PERCY
CLARK
BY
DEZSOE STEINHERZ
ATTORNEY

INVENTOR
ADRIAN PERCY
CLARK
BY
DEZSOE STEINHERZ
ATTORNEY

INVENTOR
ADRIAN PERCY CLARK
BY
DEZSOE STEINHERZ
ATTORNEY

INVENTOR
ADRIAN PERCY CLARK
BY
DEZSOE STEINHERZ
ATTORNEY

INVENTOR
ADRIAN PERCY
CLARK
BY
DEZSOE STEINHERZ
ATTORNEY

United States Patent Office 3,307,112
Patented Feb. 28, 1967

3,307,112

DEMODULATOR CIRCUITS FOR FREQUENCY MODULATED ELECTRICAL SIGNALS

Adrian Percy Clark, Taplow, England, assignor to British Telecommunications Research Limited, Taplow, England, a British company Filed Dec. 13, 1962, Ser. No. 244,314
Claims priority, application Great Britain, Dec. 12, 1961, 45,281/61; Mar. 16, 1962, 10,202/62
7 Claims. (Cl. 329—104)

The present invention relates to demodulator circuits for frequency-modulated electrical signals and is particularly concerned with signalling systems in which the type of frequency modulating comprises a change from one carrier frequency to another carrier frequency so that the signals represent one or other of two possible values. The chief object of the invention is to provide a demodulator circuit which shall give one D.C. voltage level for one frequency and a different D.C voltage level for the other without the use of filters, tuned circuits and similar components and for transmitted signals in which the signal element duration may be as low as one cycle of the lower carrier frequency.

It is contemplated that the invention would be used in a receiver for frequency-modulated signals in which the received binary coded signal is sliced in an amplifier limiter and therefore the information carried in the frequency-modulated signal is presented to the demodulator in terms of the zero level crossings of this signal carrier. The demodulation operation therefore consists in extracting the necessary binary information from the variable time spacings of these crossings.

According to the invention, in a demodulator circuit whereby a waveform having abrupt transitions corresponding to binary signals transmitted by frequency modulation is converted into a corresponding waveform having a D.C. voltage of one or other of two values, during the interval from a transition in one direction to the following transition in the opposite direction a capacitor is charged at a substantially constant rate and its negative- (or positive-) going potential is effective by way of a clamping circuit to reset to the most negative (or positive) voltage reached the potential across another capacitor which when the voltage across the first capacitor is less negative (or positive) is charged at a substantially constant rate to a more positive (or negative) potential, the potential across the second capacitor being fed to a slicing circuit whose output has a D.C. voltage of one value when this potential is more positive than a given value and a D.C. voltage of another value when it is more negative than the given value.

According to another feature, in a demodulator circuit whereby a waveform comprising short pulses at the instants that binary signals transmitted by frequency modulation intercept the zero axis is converted into a corresponding waveform having a D.C. voltage of one or other of two values, during the intervals between successive pulses a capacitor is arranged to have its potential altered at a substantially constant rate and then suddenly restored to the original value, the potential reached before the restoration serving to reset to this value the potential across another capacitor which is otherwise altered at a substantially constant rate but in the opposite sense to that of the first capacitor, the potential across the second capacitor being fed to a diode gate which feeds a common emitter transistor amplifier to which base current bias is applied, the output from the transistor amplifier having one or other of the selected D.C. values according as the diode is forward-biased or back-biased.

A further feature of the invention is that in a demodulator circuit whereby an incoming waveform derived from binary signals transmitted by frequency modulation is converted into a corresponding waveform comprising a D.C. voltage of one or other of two values, during the period that the incoming waveform is of one polarity a capacitor is charged at a substantially constant rate while during the period that the waveform is of the opposite polarity a second capacitor is charged at a substantially constant rate, the two capacitors being effective alternately to control the resetting of a further capacitor to the highest voltage reached in either case, this capacitor being otherwise charged at a substantially constant rate but in the opposite sense to either of the first two capacitors, the potential across the third capacitor being fed to a slicing circuit whose output has a D.C. voltage of one value when this potential is more positive than a given value and a D.C. voltage of another value when it is more negative than the given value.

The invention will be better understood from the following description of two methods of carrying it into effect which should be taken in conjunction with the accompanying drawings comprising FIGURES 1–12. Of these, FIGURE 1 is a detailed circuit diagram of the demodulator itself, FIGURE 2 is a block diagram of the receiver as a whole, FIGURE 3 shows typical waveforms available in different parts of the receiver for the case in which the frequency shift between the two carrier waves is equal in cycles per second to the signalling speed in bits per second and the instantaneous frequency is constant over the whole of the duration of any signal element. FIGURE 4 indicates signal waveforms in the demodulator itself for the conditions just mentioned. FIGURES 5 and 6 are similar to FIGURES 3 and 4 but deal with the rather more onerous case where the frequency shift in cycles per second is equal to half the signalling speed in bits per second and the instantaneous frequency varies gradually in the transition from one frequency to the other. FIG. 7 shows a modified circuit which offers practical advantages and FIGS. 8–12 are curves which bear the same relation to FIG. 7 as FIGS. 2–6 bear to FIG. 1.

Considering first the block diagram of FIGURE 2 relating to the first arrangement, the incoming waveforms W1 and its inverse $\overline{W1}$ are applied to the input filter circuit IP and the waveform W1 then passes to the amplifier limiter AL which has a slicing effect. On the assumption that the incoming waveform may be seriously attenuated, this amplifier limiter may not produce sufficiently squared signals and the waveform W2 obtained therefrom is therefore passed to a Schmitt trigger circuit ST which in effect produces a further slicing action so that the resulting waveform W3 is almost completely squared. This waveform W3 is fed to an inverter I which produces a waveform W4 and this and W3 are supplied to a differentiating circuit DG which also acts as a gate, from which narrow pulses with sharp leading edges are obtained spaced at intervals corresponding to the intervals at which the waveform W1 passes through zero. Waveform W5 then extends to a pulse shaping circuit PG from which waveform W6 is obtained having the pulses further squared and made of uniform length. Waveform W6 is supplied to the demodulator D of FIGURE 1 and the output waveform W7 then extends to a lowpass filter LF and emerges as waveform W8 which is passed through a slicer SL to give the output W9 and its inverse $\overline{W9}$ if required.

These various waveforms are shown in FIGURE 3 where it will be seen that a $\underline{0}$ is represented by the higher carrier frequency and a $\underline{1}$ by the lower carrier frequency. The limiting and slicing of the waveform W1 produces the waveform W2 which as drawn appears rectangular but in practice might have appreciably sloping sides. The Schmitt trigger circuit ST, by producing a further slicing operation, deals with this possible defect and gives the waveform W3 and the inverter I produces W4. The differentiating and gate circuit DG then produces the waveform W5 which consists of a series of narrow pulses corresponding to transitions in the waveforms W3 and W4. Actually the pulses W5 have sharp leading edges but the trailing edges are substantially exponential and it is therefore desirable to make use of the pulse shaping circuit PC which converts the positive-going pulses of W5 into waveform W6 having negative-going narrow pulses which are of constant length and are adequately squared. From the waveform W6 the demodulator D according to the invention derives the waveform W7, though this is shown in FIGURE 3 in somewhat idealised form and further processing is almost certainly necessary in practice to obtain entirely satisfactory results. To this end the waveform W7 is supplied to the lowpass filter LF from which the waveform W8 is obtained and this is then sliced by SL in known manner in order to produce the waveform W9. As will be seen, this reproduces the signalling information in the form of a waveform having two discrete D.C. levels.

FIGURE 4 will be discussed in greater detail in conjunction with the actual circuits of FIGURE 1.

Figure 1:
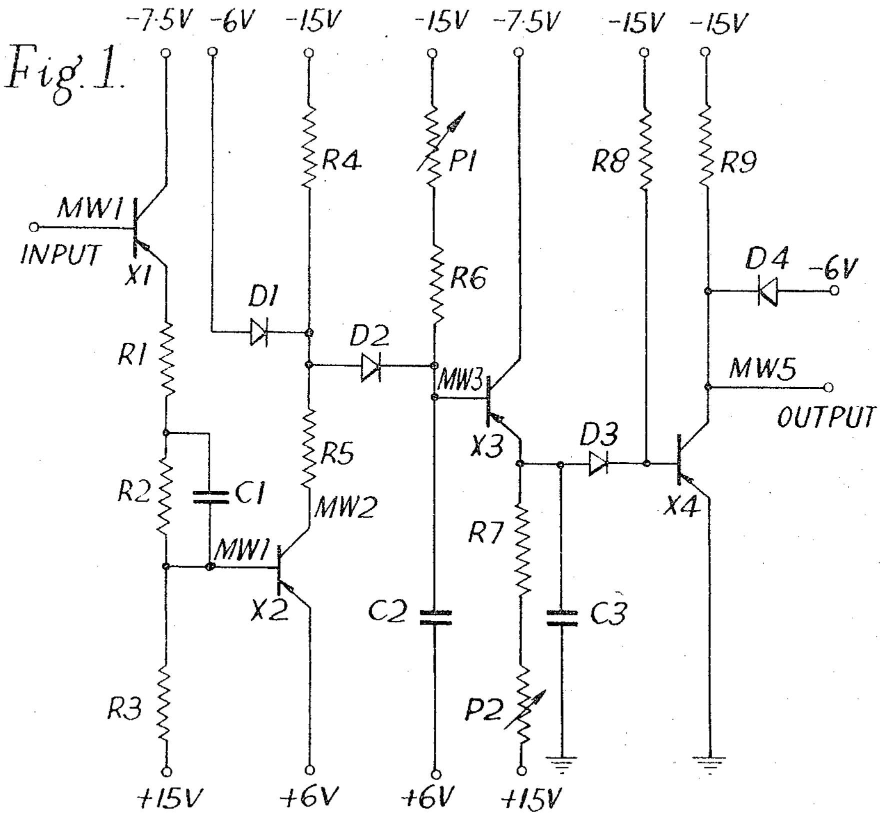
Figure 2:
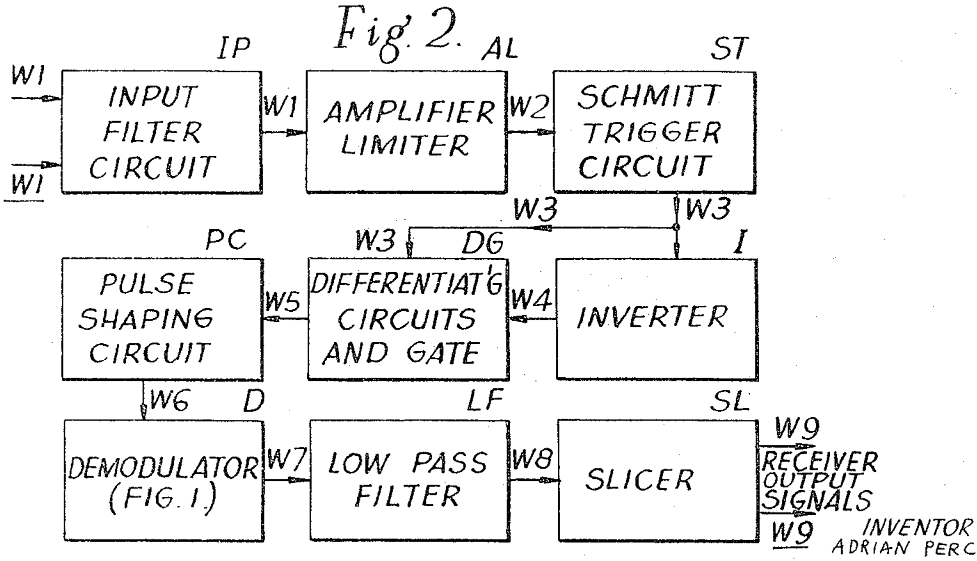
Figure 3:
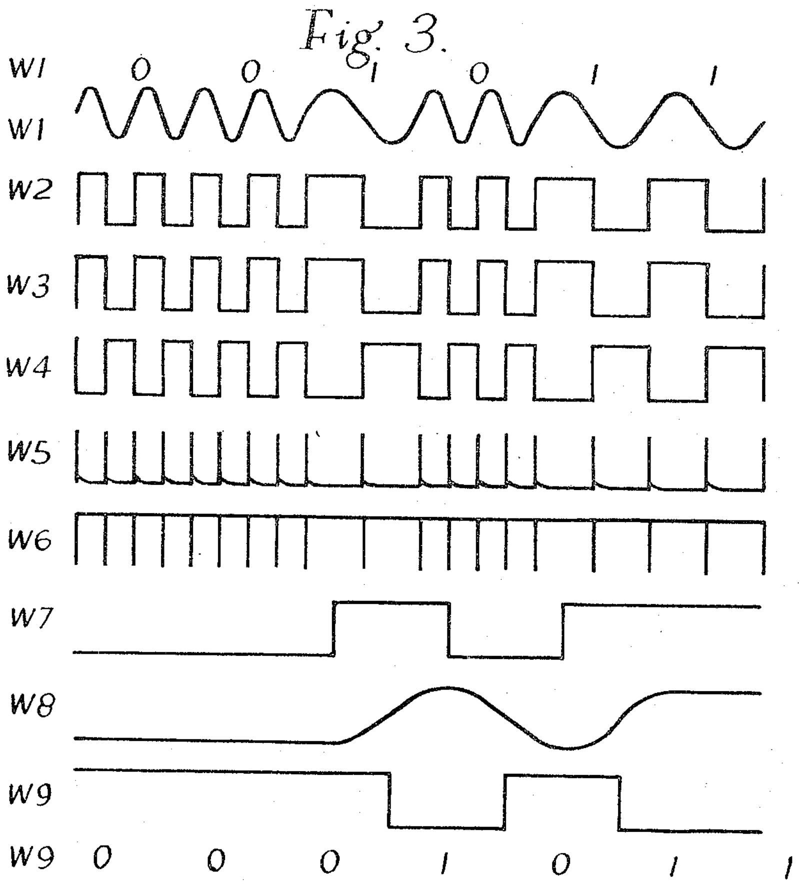
Figure 4:
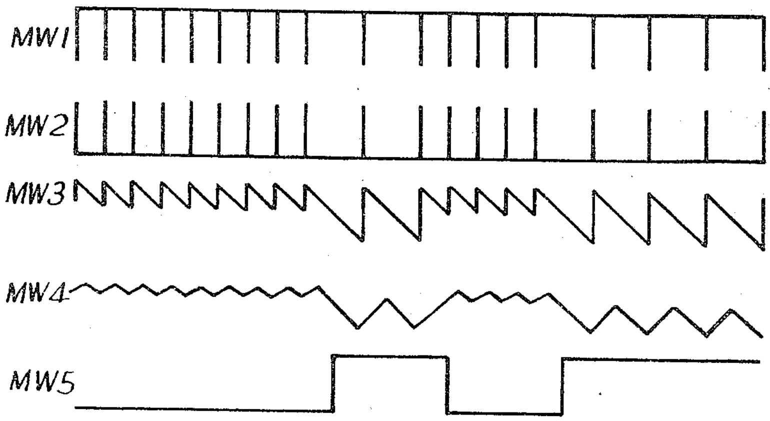
FIGURE 4 shows different waveforms occurring in the various parts of the demodulator circuit and it will be appreciated that in this figure MW1 corresponds to W6 in FIGURE 3 and MW5 corresponds to W7.

On the basis of the voltage values shown in FIG. 1, it is assumed that the waveform W6 of FIGURE 3 or MW1 of FIGURES 1 and 4 comprises 6-volt pulses which are clamped between earth and −6 volts. The transistor X1 forms an emitter-follower stage which is provided to reduce as far as possible the loading on the output of the pulse shaping circuit. When the input to X1 is at earth potential, X2 is under all conditions cut off, its collector being clamped at −6 volts by way of diode D1, and diode D2 being normally reverse-biased. When the input X1 is at −6 volts during the reception of a negative pulse in MW1, the emitter of X1 is pulled negative causing an appreciable current to be fed to the base of X2. The purpose of the capacitor C1 which shunts the resistor R2 is to produce a rapid and large increase in base current to X2, and resistor R1, which is much smaller in value than either R2 or R3, serves merely to limit the maximum peak instantaneous current fed to the base of X2 and so prevent damage to the transistor. The time constant of C1 and R1 must be small enough to allow an essentially complete discharge of C1 in the shortest time interval which may be experienced between adjacent pulses in the waveform MW1. With this qualification, the voltage across C1 or R2 immediately preceding a negative pulse in MW1 will not be influenced by the previously received pulses. The total charge fed to the base of X2 during a negative pulse in MW1 must be sufficient under all conditions to cause this transistor to become fully bottomed by the end of the negative pulse, causing the voltage across C2 to be reduced to a fraction of 1 volt before the end of this negative pulse. The resistor R5 in the collector circuit of transistor X2 is very small and serves only to limit the peak instantaneous collector current in X2 to a value which will not damage the transistor. Thus at each negative pulse in MW1, the voltage at the base of X3 is pulled positively to nearly +6 volts. As soon as MW1 goes positive again, MW2 goes negative, that is X2 is again cut off with the collector clamped at −6 volts.

The diode D2 will now be reverse-biased, allowing capacitor C2 to be charged through P1 and R6, thus causing the voltage at the base of X3 to drift steadily more negative. This will continue till the next negative pulse in MW1 is received at which time the voltage at the base of X3 is rapidly returned to nearly +6 volts. Thus the waveform MW3 has a characteristic saw-tooth shape, the voltage at the base of X3 being returned to nearly +6 volts at each negative pulse in MW1.

The transistor X3, which is connected as an emitter follower, acts both as a gate and a buffer stage since it effectively isolates the circuit comprising P1, R6 and C2 from the following part of the demodulator circuit. Thus when X2 is cut off with D2 consequently reverse-biased, the rate of change of voltage at the base of X3 is determined effectively only by the values of P1, R6 and C2 and the −15 and +6 volt supplies. In this way a very stable rate of change of voltage at the base of X3 can be obtained, particularly if as is preferably the case, D2 is a silicon diode with a very low maximum leakage current and X3 is a high-gain silicon transistor. X2 is preferably a germanium transistor with a low collector-emitter bottoming voltage.

The emitter of X3 is coupled to the circuit comprising capacitor C3 and resistors R7 and P2. As the voltage at the base of X3 approaches one of the negative peaks in MW3, the potential of the junction of C3 and R7 is changed to a corresponding negative voltage, this being of course more positive than the voltage at the base of X3 by the emitter-base voltage of X3. When the waveform MW3 now goes positive to nearly +6 volts, the emitter-base junction of X3 is reverse-biased, thus completely disconnecting the junction of C3 and R7 from the base of X3. The voltage at the junction of C3 and R7 will now steadily drift more positive until the emitter-base junction of X3 again becomes forward-biased, causing the voltage at the junction of C3 and R7 again to be pulled more negative to a voltage corresponding to the next negative peak in MW3. Thus at each negative peak in MW3, the potential at the junction C3 and R7 is set to a corresponding potential and following the positive excursion in MW3, the potential at the junction of C3 and R7 drifts steadily positive until against reset by MW3 and so on. Thus the waveform MW4 at the emitter of X3 derives its particular shape.

As long as the voltage at the emitter of X3 is more than slightly positive with respect to earth, the diode D3 is forward-biased and the transistor X4 is cut off. Under these conditions the current through P2 and R7 tends to make the potential at the emitter of X3 drift more positive, whereas both the current through R8 and the collector-base leakage current of X4 tend to make the potential at the emitter of X3 drift more negative. Thus under all conditions it must be ensured that the current through R7 and P2 is always larger than the other two currents combined so that the potential at the junction of C3 and R7 always tends to drift more positive. Provided that the transistor X4 is cut off however, the rate of drift is not important and therefore a germanium transistor may be used for X4 in spite of its much higher maximum collector-base leakage current.

As long as the voltage of the emitter of X3 is more than slightly negative with respect to earth, the diode D3 is reverse-biased and the transistor X4 is always fully bottomed. The junction of C3 and R7 is now isolated from the transistor stage X4. As long as the emitter-base junction of X3 is forward-biased, the potential at the junction of C3 and R7 will be pulled negative to a voltage corresponding to that in the waveform MW3. However as soon as MW3 is reset to nearly +6 volts, the emitter-base junction of X3 is reverse-biased and the junction of C3 and R7 is now effectively isolated from all other parts of the circuit. Under these conditions the voltage at the junction of C3 and R7 will drift steadily positive at a rate determined solely by the values of C3, R7 and P2 and the supply voltage. Thus a very stable rate of change of voltage at the junction of C3 and R7 can be obtained, particularly if a silicon transistor is used for X3 and a silicon diode for D3, both of these having a very low maximum leakage current.

The voltage at the junction of C3 and R7 will continue to drift steadily positive until either the emitter-base junction of X3 becomes forward-biased due to a negative voltage at the base of X3, thus clamping the junction of C3 and R7 to the base potential of X3, or the voltage at the junction of C3 and R7 becomes sufficiently positive to cause D3 to be forward-biased thus pulling the base of X4 positive and so cutting off this transistor. As soon as the latter effect takes place, the rate of change of the voltage at the junction of C3 and R7 is reduced and the slower rate of drift will continue until eventually the emitter-base junction of X3 becomes forward-biased, thus again clamping the junction of C3 and R7 to the base potential of X3. The voltage at the junction of C3 and R7 thus undergoes repeated cycles of being reset by the voltage at the base of X3 and then being allowed to drift steadily positive until again reset. As can be seen from the wavefrom MW4 in FIGURE 4, the time constants associated with C2 and C3 are so arranged that at the higher of the two different carrier frequencies the emitter of X3 is always more than slightly positive and that at the lower of the two different carrier frequencies in W1 of FIGURE 3, the emitter of X3 is always more than slightly negative. Thus at the higher carrier frequency X4 is always cut off, giving a negative level in MW5 and at the lower carrier frequency X4 is always bottomed, giving a positive level in MW5.

The rates of change of voltage associated with C2 and C3 are chosen as follows. The rate of change of voltage at the base of X3 when this is drifting more negative is such that at the higher of the two carrier frequencies in W1 of FIGURE 3, the emitter voltage of X3 will never quite become sufficiently low to allow the transistor X4 to conduct. Thus under these conditions X4 will remain permanently cut off since the tendency of the voltage at the emitter of X3 is always to drift more positive when not clamped to the base potential.

The rate of change of voltage at the base of X3 when this is drifting more negative having been fixed, the rate of change of voltage at the emitter of X3 when this is negative and drifting more positive is arranged to be such that at the lower of the two carrier frequencies in W1 of FIGURE 3, the emitter voltage of X3 will never quite become sufficiently positive to prevent the transistor X4 from remaining fully bottomed. In practice the charging current which flows into C3 when the emitter voltage of X3 is negative and being allowed to drift positive is kept as low as possible, giving correspondingly the lowest possible value of C3. C2 should then be chosen to have at least twice the value of C3 and preferably more and the charging current through P1 and R6 correspondingly adjusted. In this way the loading effects of C3, R7 and P2 on C2, R6 and P1 when the base voltage of X3 is drifting negative and the emitter-base junction of X3 is forward-biased is kept to a minimum. If use is made of a high current gain transistor for X3, this can easily be reduced to the order of 1% even for the minimum values of current gain for the specified transistor.

It is an important advantage of the circuit according to the invention that the need for post-detection filters is greatly reduced and D.C. amplifiers are not required since the change in D.C. level is likely to be adequate.

A further important advantage of the circuit is that the rate of change of voltage at the base of X3 when this is drifting more negative and the rate of change of voltage at the emitter of X3 when this is drifting more positive can each be made to depend essentially only on the supply voltages and on the values of C2, R6 and P1, and C3, R7 and P2 respectively. Given stabilised supplies and good quality types for these components, very stable operation can be obtained.

The only other appreciable source of drift in the circuit settings could be changes in the collector-emitter voltage of X2 when this is bottomed, changes in the forward voltage drop across D2 and D3 when they are conducting, and changes in the emitter-base voltages of X3 and X4 when these are conducting. The collector-emitter voltage of X2 when this is bottomed is very little affected by temperature and the change with temperature of the forward voltage drop across D2 when this is conducting will tend to balance that of the emitter-base junction of X3 when this is conducting and similarly the change with temperature of the forward voltage drop across D3 when this is conducting will tend to balance that of the emitter-base junction of X4 when this is conducting. Thus very good temperature stabilisation is obtained with this circuit.

P1 and P2 have been included in series with R6 and R7 respectively so that initial spread in the values of resistors and capacitors and of the supply voltages may be compensated for readily but once these have been adjusted and assuming that good components and stabilised supplies are used, very little drift should be experienced in the adjustment of this circuit with either temperature or time.

In practice it would always be desirable that the output signal MW5 in FIGURE 4 should be fed to an integrator or lowpass filter circuit. As shown in FIGURE 3, the waveform W7 is assumed to be fed to a lowpass filter circuit and the smoothed output waveform W8 is sliced on a central horizontal axis by the slicer to give the receiver output waveform W9 which represents 1 as a negative level and 0 as a positive level.

Figure 5:
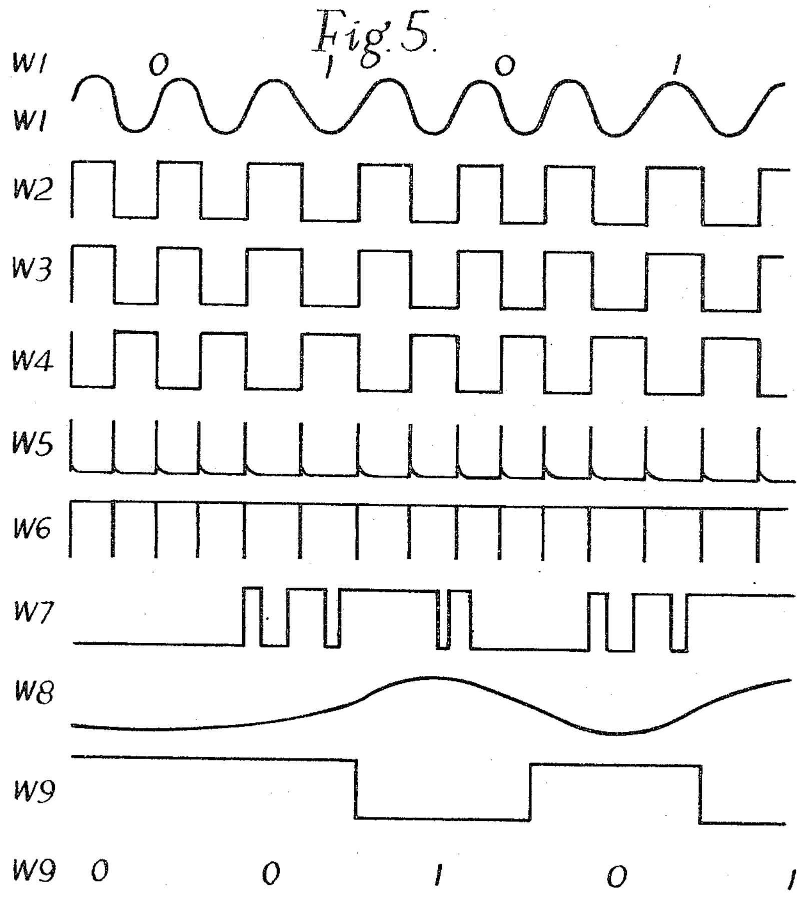
FIGURES 5 and 6 are similar to FIGURES 3 and 4 for somewhat different operating conditions and the differences will become apparent as the description proceeds.

The various waveforms shown in FIGURES 3 and 4 are those which would be obtained with the ideal received signal waveform W1 in FIGURE 3. In practice, for a given signalling speed a slightly smaller frequency shift would often be used and in many cases the carrier frequency would vary gradually and not instantaneously in a transition from one of the two different frequencies to the other. An example of this state of affairs is shown in the waveforms of FIGURES 5 and 6 where the frequency shift in cycles per second is half the signal element rate and the instantaneous frequency varies vary gradually in the transition from one frequency to the other.

Figure 6:
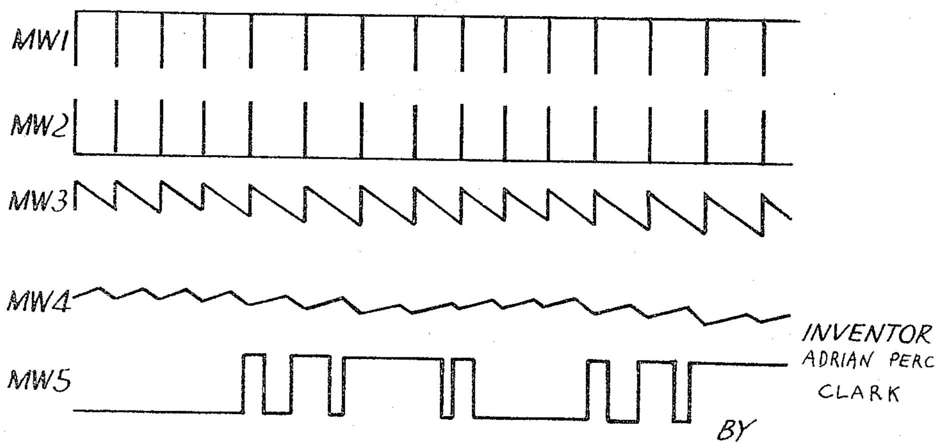

The waveforms MW1–MW5 in FIGURE 6 illustrate clearly the mode of operation of the demodulator. It can be seen that if the demodulator were adjusted so that MW5 was only just continuously negative at the higher carrier frequency and only just continuously positive at the lower carrier frequency, then for any continuous carrier frequency between these two values the waveform MW5 would contain a repetitive square wave signal for which the duration of the positive levels was proportional to the difference between the duration of one cycle of this carrier frequency and that of the higher of the two limiting frequencies. This may thus be regarded as a pulse width modulating circuit. The use of a lowpass filter followed by a slicer will however still give the desired two-level output signal W9 in FIGURE 5 and the only disadvantage is that the filter needs to have a somewhat sharper cut-off if the same standard of performance is to be obtained.

Figure 7:
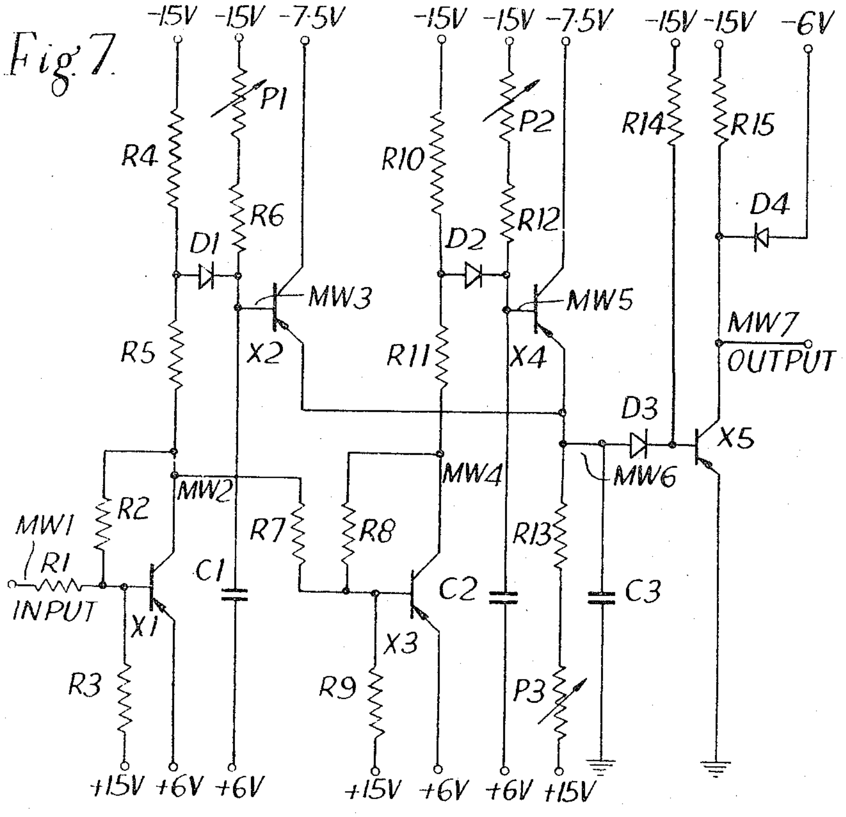
Figure 8:
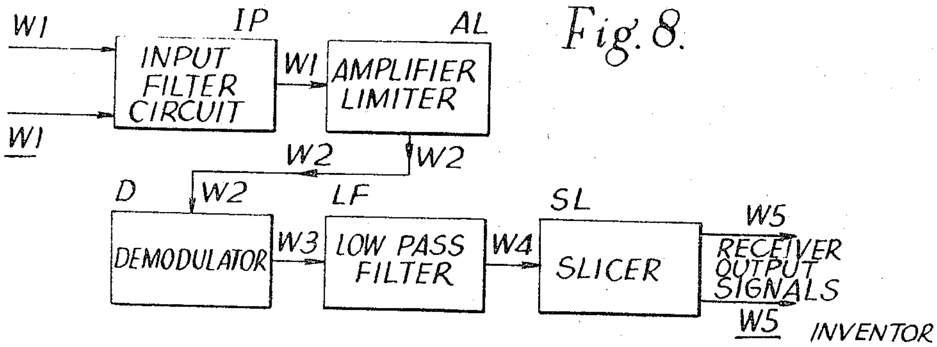

Considering now the details of the second arrangement and first the block diagram of FIGURE 8, the incoming waveform W1 and its inverse $\overline{W1}$ are applied to the input filter circuit IP and the waveform W1 then passes to the amplifier limiter AL which has a slicing effect. This takes place accurately along the centre line of the waveform so that the negative and positive portions are equal. The waveform W2 from the amplifier limiter is fed to the demodulator D, details of which are shown in FIGURE 7, and the output waveform W3 then extends to a lowpass filter LF and emerges as waveform W4 which is passed through a slicer SL to give the output W5 and its inverse $\overline{W5}$ if this is required.

Figure 9:
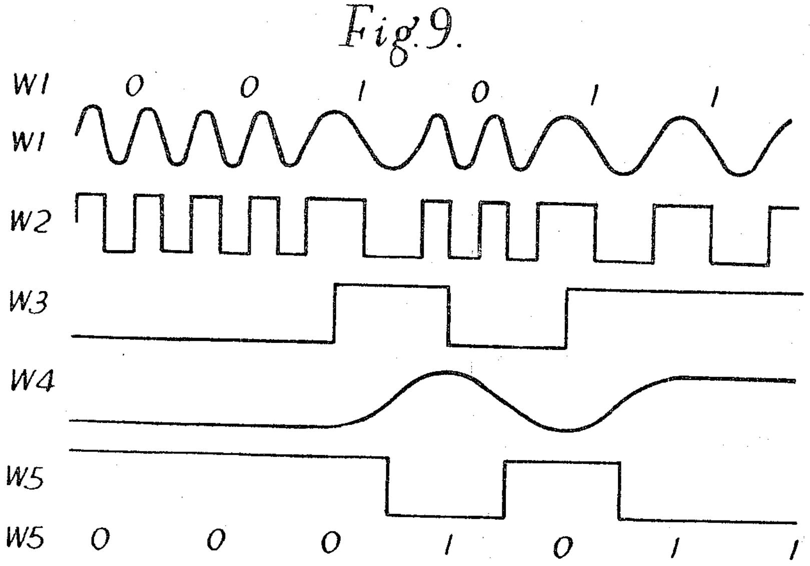

These various waveforms are shown in FIGURE 9, where it will be seen that again a 0 is represented by the higher carrier frequency and a 1 by the lower carrier frequency. The limiting and slicing of the waveform W1 produces the waveform W2 which as drawn appears rectangular but in practice might have appreciably sloping sides. The improved demodulator is such that the output obtained therefrom is the waveform W3 which is shown in FIGURE 9 in somewhat idealised form and almost certainly requires additional processing in practice to obtain entirely satisfactory results. It is accordingly supplied to the lowpass filter LF from which the waveform W4 is obtained and this is then sliced by SL in known manner in order to produce the waveform W5. As will be seen, this reproduces the signalling information in the form of a waveform having two discrete D.C. levels.

Figure 10:
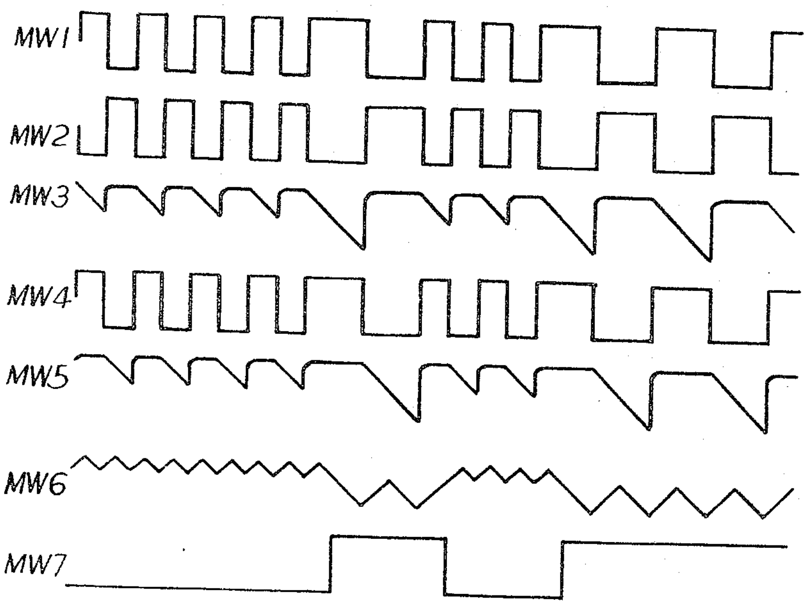

FIGURE 10 shows different waveforms occurring in the various parts of the demodulator circuit of FIGURE 7 and it will be appreciated that in this figure MW1 corresponds to W2 in FIGURE 9 and MW7 corresponds to W3. FIGURE 10 will be discussed in greater detail in conjunction with the actual circuits of FIGURE 7.

Figure 11:
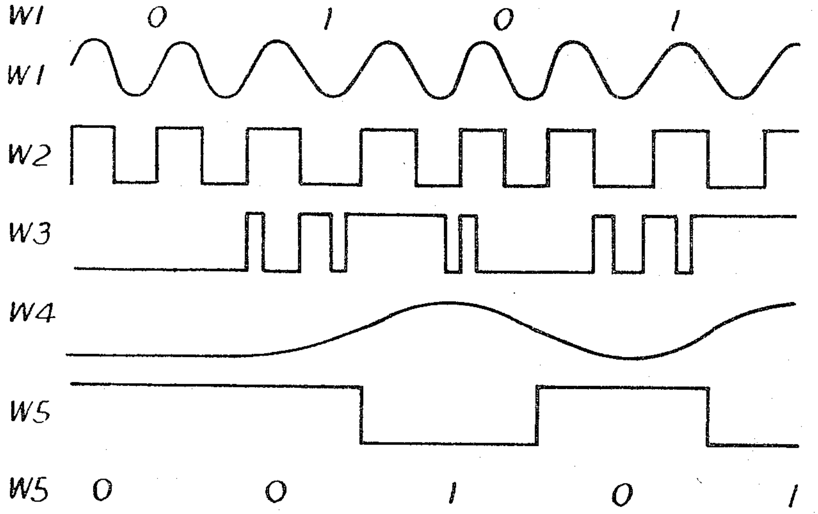
Figure 12:
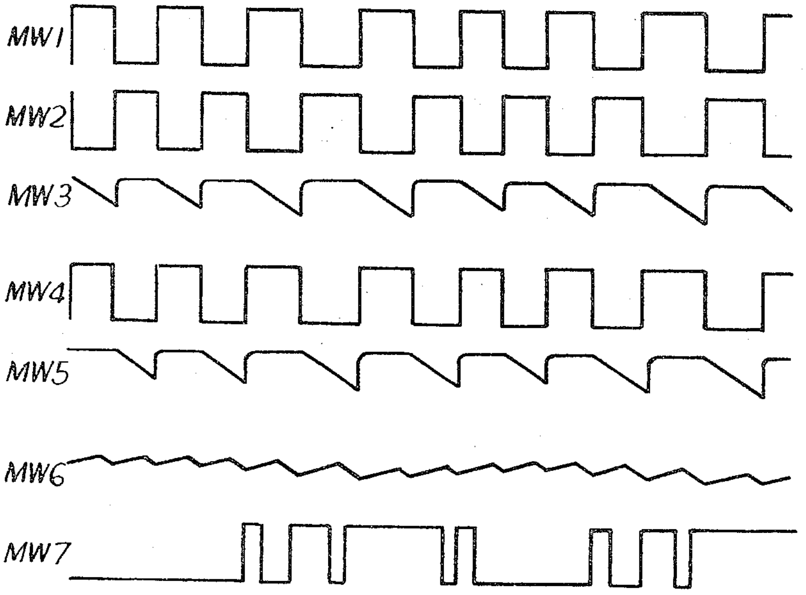

FIGURES 11 and 12 are similar to FIGURES 9 and 10 and represent somewhat different operating conditions and the differences will become apparent as the description proceeds.

On the basis of the voltage values shown in FIG. 7, it is assumed that the waveform W2 of FIGURES 9 and 11 or MW1 of FIGURES 10 and 12 comprises 6-volt pulses which are clamped between earth and −6 volts. The transistor X1 forms a common emitter amplifying stage which provides the inverse waveform MW2 for the complementary half of the circuit. The negative feedback resistor R2 connected between the collector and base of X1 serves to limit the voltage gain of this stage since high voltage gain is not required here and it also reduces the output impedance of this stage, thus correspondingly reducing the effect of C1 on the output waveform MW2. Resistor R5 will normally have a low value since the main purpose of this resistor is to limit the peak instantaneous collector current of X1 when the collector is going positive and so prevent damage to this transistor. Resistor R5 also prevents undue rounding of the waveform MW2 by the capacitor C1. The transistor stage X1 is so designed that when the input waveform MW1 goes negative, thus causing MW2 to go positive, sufficient collector current is available from X1 in order to achieve a rapid positive transition in MW2, X1 being fully bottomed, and so to discharge capacitor C1 through D1, R5 and X1 as soon as possible after receiving the corresponding negative-going transition in MW1. As long as MW1 remains negative, X1 is held bottomed, thus holding the voltage across C1 at a fraction of one volt. When MW1 goes positive, X1 is cut off, causing MW2 to go negative as far as this is permitted by resistors R2–R5. The diode D1, which is preferably of the silicon type, is now reverse-biased, thus allowing C1 to be charged through P1 and R6 from the −15 volt supply, and causing the voltage at the base of X2 to drift steadily more negative. This will continue until MW1 goes negative again, when X1 is bottomed and this pulls the voltage at the base of X2 rapidly to nearly +6 volts again. It remains at this value till MW1 goes positive again when once more the voltage of the base of X2 begins to drift steadily more negative and so on. This is reflected in the shape of the waveform MW3 in FIGURE 10.

The common emitter transistor stage X3 is generally similar to X1, its output being also coupled to a circuit identical to that for X1. The method of operation of the transistor circuit X3 together with R10, R11, D2, P2, R12 and C2 is therefore identical to that of the transistor circuit X1 in conjunction with R4, R5, D1, P1, R6 and C1.

The only difference is that the transistor stage X3 is fed from MW2 which is the inverse of MW1. The waveform MW4, FIGURE 10, is therefore the inverse of MW2 (and hence the same as MW1) and MW5 is clamped positive when MW3 is drifting negative and vice versa.

The emitter followers X2 and X4 each act both as a gate and as a buffer stage. Each effectively isolates the previous circuit (P1, R6 and C1 in the case of X2 and P2, R12 and C2 in the case of X4) from the following part of the demodulator circuit. Thus when X1 is cut off with D1 consequently reverse-biased, the rate of change of voltage to the base of X2 is determined effectively only by the values of P1, R6 and C1 and the −15 volt and +6 volt supplies. Similarly when X3 is cut off with diode D2 consequently reverse-biased, the rate of change of voltage at the base of X4 is determined effectively only by the values of P2, R12 and C2 and the −15 volt and +6 volt supplies. In this way a very stable rate of change of voltage at the base of either X2 or X4 can be obtained when these are drifting negative, particularly if, as assumed, D1 and D2 are diodes of the silicon type with very low maximum reverse leakage currents and X2 and X4 are high gain silicon transistors also having very low maximum emitter-base leakage currents. X1 and X3 are preferably germanium transistors capable of delivering the required values of peak collector current and of bottoming under these circuit conditions within a period which is short compared with the minimum half cycle period for the received signal carrier. X1 and X3 should also have a low collector-emitter bottoming voltage.

The emitters of X2 and X4 are connected together and also to the rest of the demodulator circuit which is in every respect identical with the corresponding portion of the demodulator circuit shown in FIGURE 1, both as regards the circuit details and in the method of operation. The two transistors X2 and X4 together act as a gate whose output voltage corresponds always to the more negative of the two input voltages at the bases of the two transistors, allowing of course for the base-emitter voltage drop in each case. The two transistors X2 and X4 with the waveforms MW3 and MW5 at their bases are therefore exactly equivalent to the one transistor X3 with the waveform MW3 at its base in the FIGURE 1 arrangement.

When the waveform MW3 is drifting negative, MW5 being clamped at nearly +6 volts, the transistor X2 will be conducting and pulling the junction of R13 and C3 more negative while the emitter-base junction of X4 is reverse-biased, this transistor being therefore effectively isolated from the junction of R13 and C3. When the waveform MW5 is drifting negative, MW3 being clamped at nearly +6 volts, transistor X4 will be conducting and pulling the junction of R13 and C3 more negative while the emitter-base junction of X2 is reverse-biased, this transistor therefore being effectively isolated from the junction of R13 and C3. It will be appreciated that during those portions of the waveforms MW3, MW5 and MW6 where both MW3 and MW5 are more positive than MW6, both X2 and X4 will be cut off with their emitter-base junctions reverse-biased, thus completely isolating the following circuit P3, R13 and C3 from the first part of the demodulator. During these periods, the junction of R13 and C3 will drift steadily positive due to the charging of C3 by way of P3 and R13. These portions of the waveform MW6 correspond to those periods in the FIGURE 1 arrangement when the emitter-base junction of X3 is reverse-biased. The other portions of the waveform MW6 correspond to the various periods in the FIGURE 1 arrangement when the emitter-base junction of X3 is conducting and the emitter-follower is pulling the voltage at the emitter more negative.

The method of operation of the remaining portion of the demodulator circuit which is fed from the emitters of X2 and X4 is exactly the same as that described for the corresponding portion of the circuit of the FIGURE 1 arrangement and will therefore not be dealt with in detail.

It will already have been appreciated that this second arrangement comprises two similar portions, one comprising the transistors X1 and X2 with the associated components and the other comprising the transistors X3 and X4 together with their associated components. The first of these portions is fed from the sliced signal waveform W2 and the second is fed from the inverse of this. Each of these portions takes over the function of the corresponding single portion in the earlier circuit for half a cycle of the signal carrier at a time, the other portion being reset during this time. By duplicating the first portion of the original circuit in this way, not only will the circuit operate directly from the sliced signal W2 itself, no longer requiring a short resetting pulse, but also since one portion at a time is reset during half a cycle of the carrier, far less stringent requirements need to be satisfied in resetting the circuit ready for the next half cycle since there is much more time available. One result of this is that it is possible to achieve more accurate operation of the circuit while still allowing a longer time for discharging the capacitor. It is however still desirable that the capacitor be discharged fairly rapidly in order to maintain the optimum tolerance to both noise and distortion, since even with the second arrangement the capacitor should be almost completely discharged in a time that is small compared with the shortest half cycle duration of the signal carrier.

The FIGURE 7 arrangement shares the advantages of the FIGURE 1 arrangement in that it is very stable due to the good isolation of the capacitor-resistor networks in each case while the capacitor is being charged through the associated resistor. It also has good temperature stability which is important in circuits of this character.

The signal waveforms shown in FIGURES 9 and 10 are those which would be obtained with the ideal received signal waveform W1 in FIGURE 9. In practice, for a given signalling speed a slightly smaller frequency shift would often be used and in many cases the carrier frequency would vary gradually rather than instantaneously in the transition from one of the two different frequencies to the other.

A somewhat extreme example of this state of affairs is shown in the waveforms of FIGURES 11 and 12 where the frequency shift in cycles per second is half the signal element rate in bits per second and the instantaneous frequency varies very gradually in the transition from one frequency to the other. The waveforms MW1–MW7 in FIGURE 12 illustrate clearly the mode of operation of the demodulator. It can be seen that if the demodulator is adjusted so that MW7 is only just continuously negative at the higher carrier frequency and only just continuously positive at the lower carrier frequency as shown in FIGURE 12, then for any continuous carrier frequency between these two values the waveform W7 would contain a repetitive square wave signal for which the duration of the positive levels was proportional to the difference between the duration of one cycle of this carrier frequency and that of the higher of the two limiting frequencies. As explained in connection with the FIGURE 1 arrangement however, the desired two-level output signal may still be obtained by the use of a lowpass filter followed by a slicer, and the only reservation is that the filter may need to have a somewhat sharper cut-off to give the same standard of performance of the receiver circuit.

I claim:

1. In a demodulating arrangement for a signalling system having binary information transmitted by frequency modulation, a terminal for receiving an incoming signal waveform, means for slicing said incoming signal waveform so as to produce a squared waveform, a first capacitor means controlled by said squared waveform for charging said first capacitor at a substantially uniform rate for the period between successive transitions of said squared waveform and resetting it to its initial state of charge at the end of each such period, a second capacitor, means associated with said first capacitor for charging said second capacitor at a substantially uniform rate from the occurrence of one of said transitions for a period dependent on the state of charge of said first capacitor, means associated with said first capacitor for thereupon discharging said second capacitor at a substantially uniform rate until the occurrence of the succeeding transition, and a slicing circuit associated with said second capacitor for producing a waveform having one or other of two values in dependence on the state of charge of said second capacitor.

2. In a demodulating arrangement for a signalling system having binary information transmitted by frequency modulation, a terminal for receiving an incoming signal waveform, means for slicing the incoming signal waveform so as to produce a squared waveform, means for producing identical narrow pulses at each transition of said squared waveform, a first capacitor, a diode, connections for applying said narrow pulses to said first capacitor by way of said diode, means for biassing said diode so that each of said narrow pulses cause said first capacitor to be set to a predetermined state of charge while between successive pulses said diode is substantially non-conducting, means for charging said first capacitor at a substantially uniform rate for the period between successive narrow pulses, a second capacitor, means associated with said first capacitor for charging said second capacitor steadily from the occurrence of one of said pulses for a period dependent on the state of charge of said first capacitor, means for thereupon discharging said second capacitor steadily until the occurrence of the succeeding one of said pulses, and a slicing circuit associated with said second capacitor for producing a waveform having one or other of two values in dependence on the state of charge of said second capacitor.

3. In a demodulating arrangement for a signalling system having binary information transmitted by frequency modulation, a terminal for receiving an incoming signal waveform, means for slicing said incoming signal waveform so as to produce a squared waveform, a first capacitor, means controlled by said squared waveform for charging said first capacitor at a substantially uniform rate for the period between successive transitions of said squared waveform and resetting it to its initial state of charge at the end of each such period, a second capacitor, a transistor having its base electrode connected to said first capacitor, its collector electrode connected to a fixed potential and its emitter electrode connected to said second capacitor, means for charging said second capacitor at a substantially uniform rate from the occurrence of one of said transitions until the base-emitter junction of said transistor becomes reverse-biased due to the state of charge of said first capacitor, means for thereupon discharging said second capacitor at a substantially uniform rate until the occurrence of the succeeding transition, and a slicing circuit associated with said second capacitor for producing a waveform having one or other of two values in dependence on the state of charge of said second capacitor.

4. In a demodulating arrangement for a signalling system having binary information transmitted by frequency modulation, a terminal for receiving an incoming signal waveform, means for slicing said incoming signal waveform so as to produce a squared waveform, means for producing identical narrow pulses at each transition of said squared waveform, a first capacitor, means for charging said first capacitor at a substantially uniform rate for the period between successive ones of said pulses and resetting it to its initial state of charge at the end of each such period, a second capacitor, means associated with said first capacitor for charging said second capacitor at a substantially uniform rate from the occurrence of each of said pulses for a period dependent on the state of charge of said first capacitor, means associated with said second capacitor for thereupon discharging said second capacitor at a substantially uniform rate until the occurrence of the succeeding one of said pulses and a slicing circuit associated with said second capacitor for producing a waveform having one or other of two values in dependence on the state of charge of said second capacitor.

5. In a demodulating arrangement for a signalling system having binary information transmitted by frequency modulation, a terminal for receiving an incoming signal waveform, means for slicing said incoming signal waveform so as to produce a squared waveform, means for producing an inverted waveform corresponding to said squared waveform, means for differentiating said squared waveform and said inverted waveform to produce narrow pulses at each transition of said squared waveform, a first capacitor, means for charging said first capacitor at a substantially uniform rate for the period between successive ones of said pulses and resetting it to its initial state of charge at the end of each such period, a second capacitor, means associated with said first capacitor for charging said second capacitor at a substantially uniform rate from the occurrence of each of said pulses for a period dependent on the state of charge of said first capacitor, means associated with said first capacitor for thereupon discharging said second capacitor at a substantially uniform rate until the occurrence of the succeeding one of said pulses and a slicing circuit associated with said second capacitor for producing a waveform having one or other of two values in dependence on the state of charge of said second capacitor.

6. In a demodulating arrangement for a signalling system having binary information transmitted by frequency modulation, a terminal for receiving an incoming signal waveform, means for slicing said incoming signal waveform so as to produce a squared waveform, a first capacitor, means for charging said first capacitor at a substantially uniform rate during each positive portion of said squared waveform and for resetting it to its initial state of charge at the succeeding positive-to-negative transition, a second capacitor, means for charging said second capacitor at a substantially uniform rate during each negative portion of said squared waveform and for resetting it to its initial state of charge at the succeeding negative-to-positive transition, a third capacitor, means associated with said first capacitor for charging said third capacitor steadily from the beginning of each of said positive portions for a period dependent on the state of charge of said first capacitor and thereupon discharging said third capacitor steadily for the remainder of said positive portion, means associated with said second capacitor for charging said third capacitor steadily from the beginning of each of said negative portions for a period dependent on the state of charge of said second capacitor and thereupon discharging said third capacitor steadily for the remainder of said negative portion, and a slicing circuit associated with said third capacitor for producing a waveform having one or other of two values in dependence on the state of charge of said third capacitor.

7. In a demodulating arrangement as claimed in claim 1 a slicing circuit comprising a diode having one terminal connected to said second capacitor, a transistor having its base electrode connected to the other terminal of said diode, its emitter electrode connected to a fixed potential and its collector electrode feeding an output circuit and means for supplying bias current to the base electrode of said transistor.

References Cited by the Examiner

UNITED STATES PATENTS

| | | | |
|---|---|---|---|
| 2,510,983 | 6/1950 | Krause | 329—104 |
| 2,918,623 | 12/1959 | Young | 329—104 |
| 3,049,673 | 8/1962 | Barry | 329—104 |

ROY LAKE, *Primary Examiner.*